United States Patent
Vezenov et al.

(10) Patent No.: US 6,969,472 B2
(45) Date of Patent: Nov. 29, 2005

(54) METHOD OF FABRICATING SUB-MICRON HEMISPHERICAL AND HEMICYLIDRICAL STRUCTURES FROM NON-SPHERICALLY SHAPED TEMPLATES

(75) Inventors: Dmitri V. Vezenov, Natick, MA (US); John M. Guerra, Concord, MA (US); Leonard Wan, Chestnut Hill, MA (US); Paul F. Sullivan, Westwood, MA (US)

(73) Assignee: LSI Logic Corporation, Milpitas, CA (US)

( * ) Notice: Subject to any disclaimer, the term of this patent is extended or adjusted under 35 U.S.C. 154(b) by 588 days.

(21) Appl. No.: 09/842,214

(22) Filed: Apr. 25, 2001

(65) Prior Publication Data

US 2002/0168592 A1 Nov. 14, 2002

Related U.S. Application Data

(60) Provisional application No. 60/285,497, filed on Apr. 19, 2001.

(51) Int. Cl.[7] .............................. B29D 11/00; G11B 7/00

(52) U.S. Cl. ...................... 216/24; 216/26; 204/192.17; 430/321

(58) Field of Search ....................... 204/192.17; 216/24, 216/26; 430/321

(56) References Cited

U.S. PATENT DOCUMENTS

| 5,230,990 | A | | 7/1993 | Iwasaki et al. |
| 5,324,623 | A | | 6/1994 | Tsumori |
| 5,694,246 | A | | 12/1997 | Aoyama et al. |
| 5,910,940 | A | | 6/1999 | Guerra |
| 6,090,907 | A | * | 7/2000 | Saito et al. ............ 528/198 |
| 6,115,348 | A | | 9/2000 | Guerra |
| 6,147,732 | A | * | 11/2000 | Aoyama et al. ........ 349/112 |

* cited by examiner

Primary Examiner—Shamim Ahmed
(74) Attorney, Agent, or Firm—Christopher P. Maiorana (57) ABSTRACT

A method for manufacturing hemi-cylindrical and hemispherical micro structures is provided. A pattern is formed onto a substrate, and a layer of material is subsequently grown onto the substrate. Due to growth characteristics, the layer will form radially symmetric features when grown to an appropriate thickness.

21 Claims, 8 Drawing Sheets

METHOD OF FABRICATING SUB-MICRON HEMISPHERICAL AND HEMICYLIDRICAL STRUCTURES FROM NON-SPHERICALLY SHAPED TEMPLATES

CROSS REFERENCE TO RELATED APPLICATIONS

This application claims priority under 35 U.S.C. 119(e) to U.S. Provisional Patent Application Ser. No. 60/285,497, entitled Microlens Structure, Manufacture, and Use, filed on Apr. 19, 2001.

BACKGROUND OF THE INVENTION

1. Field of the Invention

The present invention relates in general to a method for producing micro-optical components. More particularly, it relates to a method for the manufacture of hemi-cylindrical, and hemi-spherical micro-lenses from templates.

2. Description of the Related Art

The increasing demands in miniaturization and parallel processing of optoelectronic devices and the maturity of the process technologies in micron-scale fabrication have pushed forward the development of micro-lenses and other micro-optical components. Various types of micro-lenses developed to date include refractive lenses, diffractive lenses and mixed refractive/diffractive lenses. Refractive lenses bend or focus a light beam by rules of geometric optics where diffractive lenses alter the path of light based on Fourier optics. Mixed refractive/diffractive lenses typically include refractive lenses having the surface thereof textured with diffracting patterns to correct for chromic aberrations.

Current techniques for fabricating micro-optic components include laser micromachining, polymer island melting, localized UV radiated and heated photothermal glass, ion-beam etching of Silicon or InP, swelling the surface of glass, chemical vapor deposition of $SiH_4$ and NO, ion-beam sputtering, and binary optics techniques such as the use of 2-step Fresnel phase plates, blazed reflection grooves, and a wide variety of other techniques.

Appropriately shaped structures for micro-lenses have been created by molding the shapes from a substrate called a "stamper." Stampers for micro-optic arrays have been fabricated with a number of techniques, including fabrication of a master with precision computer-controlled diamond turning, photolithography, multiple or single beam laser lithography, laser mastering lathe, or e-beam lithography. The stamper itself is typically the end product of a one or multiple step serial replication of the original master. The micro-optic shaped geometric structure may be created from the stamper, using methods such as compression, injection, or sequential injection/compression molding. The micro-optic structure may be fabricated by a plastic injection and/or compression molding process using the stamper as part of the mold assembly.

Sub-micron scale lenses offer performance advantages in many fields, including faster optical processing, reduced aberrations, and improved signal-to-noise ratios. These features make them highly desirable for a multitude of applications. For example, individual lenses formed on the tips of optical fibers and on diode lasers in addition to arrays of lenses, have been demonstrated with desirable performance characteristics, particularly for coupling into or out of fibers, detectors and diode lasers. Arrays of refractive lenslets have been used to provide efficient coupling from arrays of energy sources to amplifier and detector arrays or to bundles of optical fibers.

Figure 1:
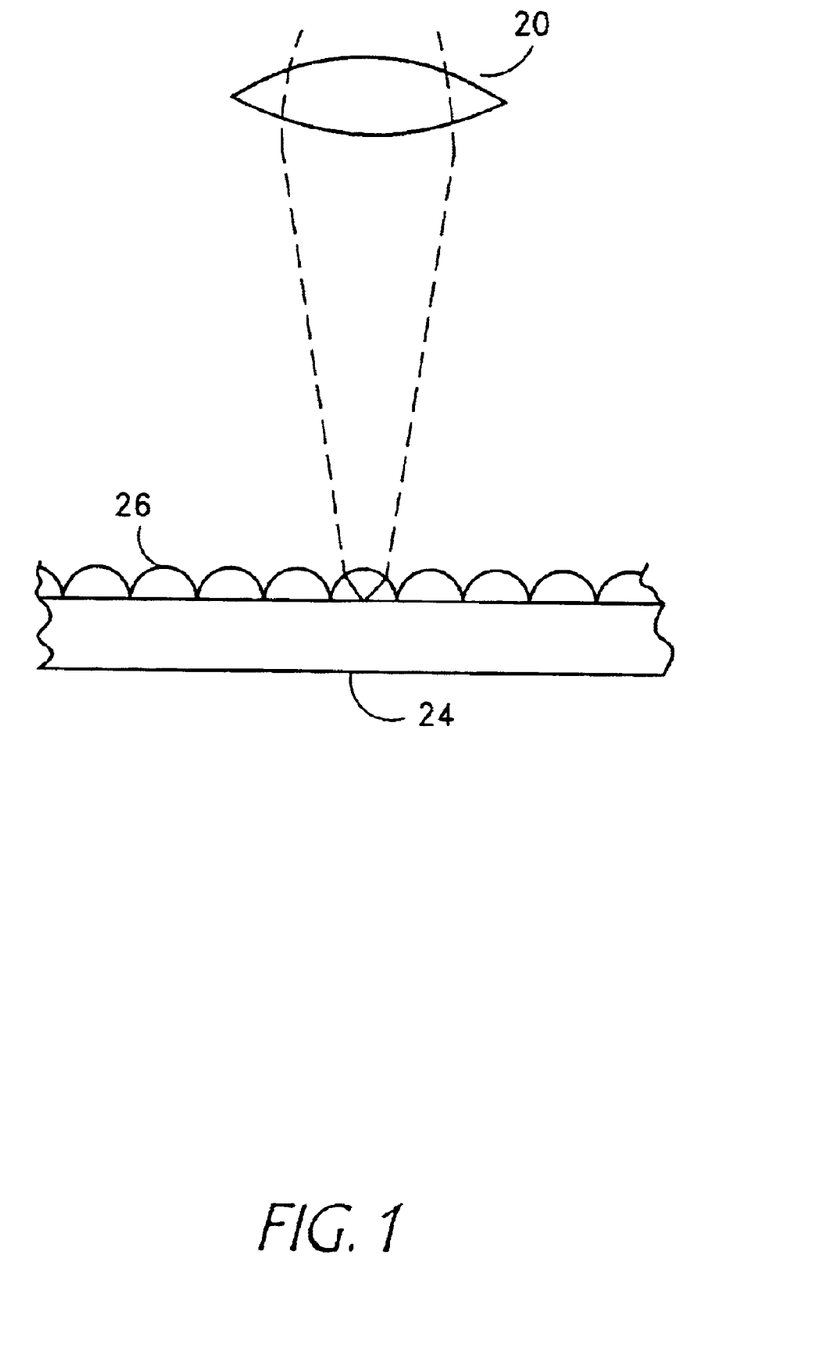
FIG. 1 is a cross section of a prior art optical disc including micro-lenses.

Micro-lenses have also been applied to optical data storage media to improve data density. Aspects of this application are described in U.S. Pat. No. 5,910,940 to Guerra, which is herein incorporated by reference in its entirety. FIG. 1 illustrates such a system including an objective lens 20, optical disc 24, and a plurality of micro-lenses 26. The use of an array of micro-lenses 26 in conjunction with objective lens 20 provides a narrower focus on the surface of disc 20 for detection of higher density stored data.

In this embodiment, micro-lenses may be created in much the same way as the pits and grooves of standard CD or DVD disks. A master disk may be produced with the same steps, for instance exposure of a glass disk coated with photo-resist on a laser mastering machine (also called a Laser Beam Recorder or LBR) and subsequent development of the photo resist. Instead of pits or flat-bottomed continuous grooves, the exposure parameters are adjusted to create grooves with a semicircular profile at their bottoms. Such profiles can be generated by modifications of the exposure parameters similar to those which are taught in, for instance, Principles of Optical Disk Systems (p. 194), for combining header pits with a tracking pregroove. A nickel replica of the master, also called a stamper, perhaps removed by a few replication generations, is used in an injection molding machine to form blanks, typically made of polycarbonate, having the same geometry as the master. (If the master is formed using the type of photo-resist that becomes more permanent with light exposure rather than less permanent, an even number of nickel replications will give a blank having the complementary and, in this case, desired geometry.) The grooved polycarbonate blanks are then filled with a high index dielectric followed by the other layers of a standard disk structure. Since the disk is normally viewed through the polycarbonate layer (which is not shown in FIG. 1) by the drive, the high index dielectric presents the desired convex surface to the drive.

Conventional lithographic and etching techniques employed for the fabrication of spherical or cylindrical lenses, having sub-micron features with smooth curved surfaces and with predefined surface patterns, is challenging mainly because these techniques are best suited to produce sloped or flat surfaces, not curved ones. Typical methods for fabrication, such as those used in the semiconductor industry, require fine tuning of exposure and etching parameters for conventional lithographic processes with positive and negative photoresists. These methods are extremely sensitive to variations in the process parameters, which are difficult to determine a priori. For example, a lithographic process may readily suffer from irradiation power variations and/or instabilities. A surface, or feature produced with these techniques may be approximately spherical on average, but locally will tend to show substantial deviations from this preferred shape.

Thus, although techniques have been developed to produce micro-lenses of desired shapes, they are difficult to reliably perform, and often produce lenses having some undesired characteristics.

SUMMARY OF THE INVENTION

The invention includes methods of making substantially radially symmetric sub-micron structures. The method may comprise depositing material onto a template having a corrugated surface profile along at least one dimension, wherein the depositing is performed such that the growth rate of deposited material is substantially constant in all directions normal to the template surface profile. Hemicylinders or hemishperes may be formed in this manner.

In one embodiment, a method of making a stamper or stamper ancestor for fabricating an optical disk comprises forming a substrate having a corrugated upper surface profile, depositing a layer of material onto the upper surface so as to form a combined substrate and layer structure having an upper surface profile comprising an adjacent series of structures having a substantially hemi-cylindrical contour.

In another embodiment, a method of making an optical data storage media comprises forming a substrate having a corrugated upper surface and depositing at least one layer of optically active material over the substrate. The method further comprises depositing a layer of material onto the optically active material so as to form lenses over the optically active material having a substantially hemi-cylindrical contour. In some applications a substantially transparent cover sheet may be bonded onto the lenses.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 2A:
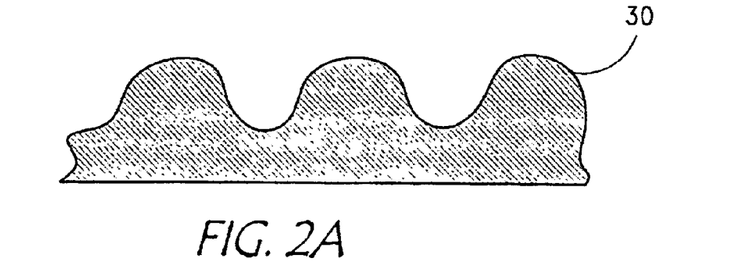
FIGS. 2A–2D show a process for fabricating an optical disk stamper or stamper ancestor from a sinusoidal substrate.

Process steps for an advantageous method of fabrication of an inverse master or stamper are depicted in FIGS. 2A to 2D. As shown in FIG. 2A, the process begins with a grooved substrate 30 which may comprise glass, polycarbonate, or other polymeric material. The grooves may be fabricated by employing, for example, any one of a number of well-known techniques, including precision computer-controlled diamond turning, photolithography, multiple-beam laser lithography, laser mastering lathe, e-beam lithography, photoablative polymer and laser techniques, or photoresist and etching techniques. All of these techniques are well known to those skilled in the art. In the method of FIGS. 2A to 2D, the grooves formed on the substrate 30 produce an approximately sinusoidal upper surface cross section. In one embodiment applicable to optical disk production, the upper surface of the substrate is grooved in a continuous spiral from the outer portion of the disk to the inner portion of the disk, and the cross sections illustrated in FIG. 2 are radial cross sections extending through the center of the disk. An approximately sinusoidally contoured upper surface of the substrate has been found to be relatively easy to produce with high reliability using conventional etching and/or grooving techniques, and is accordingly a convenient starting material. As shown in FIGS. 3A to 3D, the groove cross sections may alternatively form other shapes, such as trapezoidal, or rectangular.

Figure 2B:
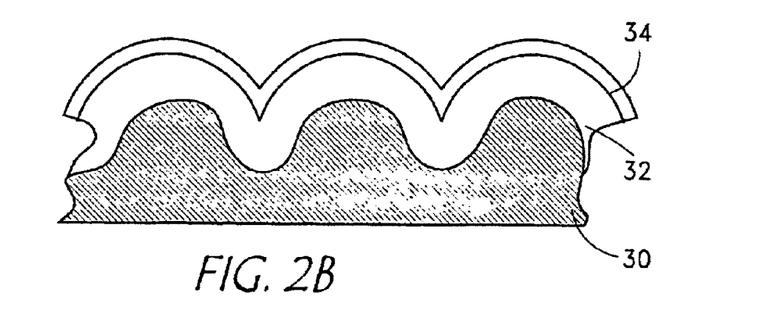

Following the formation of grooves on the substrate, and as shown in FIG. 2B, a layer of material 32 is grown onto the substrate. Any material which is suitable for vacuum deposition may be used. In some embodiments, a dielectric such as $SiO_2$ or $TiO_2$ is advantageous, although it will be appreciated that metals or semiconductors can also be utilized. This material may be sputter coated onto the grooved substrate under vacuum conditions. The process details for growing this layer of material 32 may vary over a wide range to produce hemi-cylindrical structures about 150–250 nm tall. Any process showing uniform growth rates (or at least little directional preference) will result in features of radial symmetry (i.e. hemicylinders or hemispheres), if starting either from small centers (i.e. dots/islands or lines/thin curves) or on corrugated surfaces possessing alternating convex and concave structures. For example, the process of physical vapor deposition by sputtering will result in predominantly non-directional depositions rates, because of very small mean free path for ions/atoms during sputtering and close proximity of the sample surface to the sputtering target (material source).

If the rate of growth is approximately uniform for all directions, let G be the instantaneous rate of material deposition along the normal to the surface per unit area per unit time. Let the surface profile shape be described by y=f(x). Then it can be shown that the change with time of the surface profile at point x is given by:

$$\partial f(x,t)/\partial t = G(\sin\theta - \cos\theta \cdot \partial f(x,t)/\partial x),$$

where $\theta$ is the angle that surface normal makes with the horizontal axis (X axis).

This can be rewritten as:

$$\frac{\partial f}{\partial t} = G\sqrt{1+\left(\frac{\partial f}{\partial x}\right)^2} = G\frac{ds}{dx},$$

where s is an arc path along the curve describing the shape of the surface profile.

Numerical simulations of the growth process based on this equation and starting from a wide variety of corrugated starting profiles have shown the production of highly desirable substantially radially symmetric structures such as hemispheres and hemicylinders.

After formation of the hemi-cylindrical layer 32, a release layer or film 34 is formed using a similar method to cover the hemi-cylindrical layer 32 and any remaining upper surface of the substrate 32. For example, the separation layer 34 may be formed by accumulating inorganic material such as Ag, or Au by sputtering, electroplating, or other deposition technology. This step may be performed under the same conditions, or other coating conditions known to those skilled in the art.

Figure 2C:
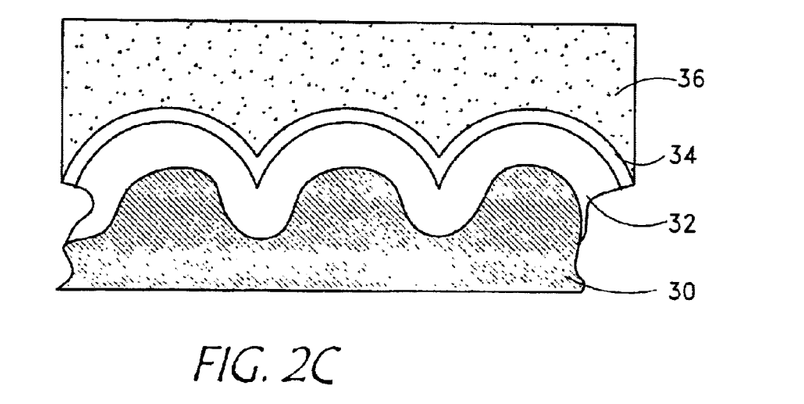

Following the deposition of the separation layer 34, FIG. 2C shows the deposition of a metal coating layer 36. This metal layer 36 preferably comprises Ni, and may be another metal suitable to process conditions. The metal layer is preferably deposited utilizing deposition techniques well known in the art such as electroplating. This layer may be grown to a variety of thicknesses depending of the intended use for the layer 36 following the formation of the layer over the substrate 34.

Figure 2D:
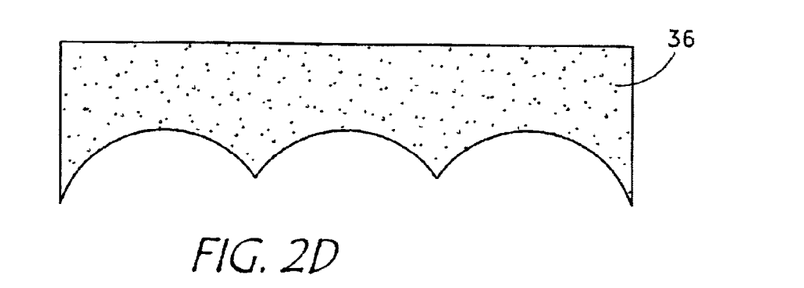

The metal layer 36 is then removed from the substrate to form a stamper or stamper ancestor as shown in FIG. 2D for the production of optical disks. This stamper is a reverse replica of the array shown in FIG. 1B. The stamper, or an odd or even replication thereof, may therefore then be used in a conventional fabrication process such as compression, injection, or sequential injection/compression molding of any of a number of plastics such as polycarbonate, acrylic, and others so as to form a hemi-cylindrical lens array over the tracks of an optical disk. As is common practice in the art, the stamper can also be used to form copies of itself or the positive hemi-cylindrical structures it was originally plated onto.

The process illustrated in FIGS. 3A to 3D is similar to that of FIGS. 2A to 2D. However, the grooves and features of the substrate 30 are initially of a flat sided geometric shape such as that of a rectangle, or a trapezoid. A layer of material 32 is applied, exhibiting the desired growth characteristics, and forming smooth hemi-cylindrical, or hemi-spherical surface profiles, the cross-section of which is shown in FIGS. 2C and 2D. The robust growth process demonstrated in both FIGS. 2 and 3 of hemi-cylindrical micro-structures is an indication that appropriate growth characteristics may occur over a wide variety of substrate topographies, allowing for flexibility and a great number of varying substrate geometries in the manufacturing process.

Figure 4A:
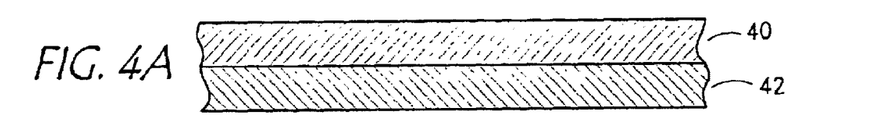
FIGS. 4A–4F show a process for fabricating an optical disk stamper or stamper ancestor from a first lithographically patterned substrate.
Figure 4B:
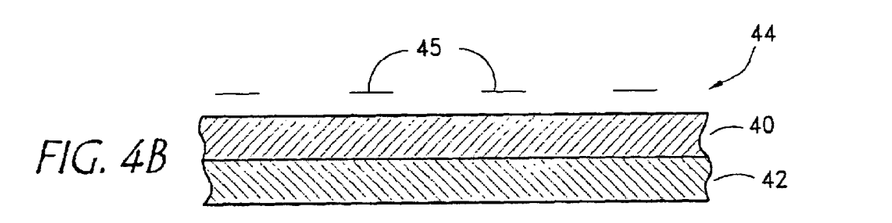
Figure 4C:
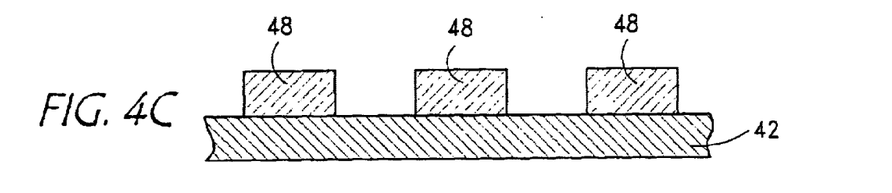

FIGS. 4A to 4F outline another process for generating a substrate topography, and for inducing a growth pattern which will yield a desired surface profile for micro-lens structures. At the first step illustrated in FIG. 4A, a film or layer of photo-sensitive synthetic resin, for example, a positive or negative photoresist 40, is formed on a substrate 42 (e.g., $SiO_2$ (glass), Si, or polymeric substrate) preferably by spin coating. FIG. 4B shows a mask 44 placed on or above the photoresist layer 40 and the photoresist layer 40 is exposed to radiation following lithographic techniques which are well known in the art. The mask 44 has portions 46 for shielding the light having a shape corresponding to the lens-base elements to be formed, or to the spaces between such lenses, depending on the type of photoresist. By developing the photoresist, as shown in FIG. 4C, lens-base elements 48 made of the photoresist remain on the substrate 42.

Figure 4D:
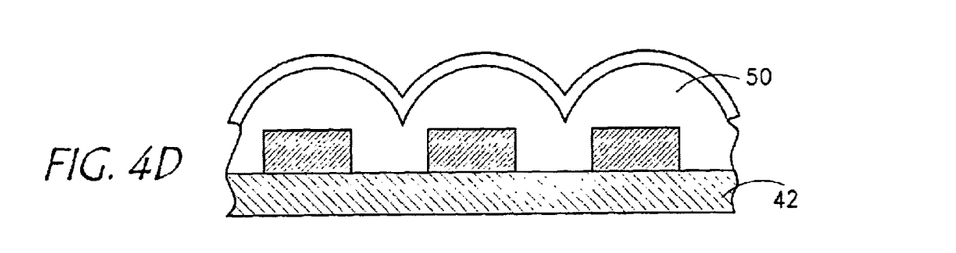

The next step, illustrated in FIG. 4D, is the deposition, and growth of a dielectric or other material over the substrate lens-base elements similar to that described above. As is noted above, the growth process is very robust, and may be performed over a wide range of process parameters. The process will yield hemi-cylindrical shapes 50 over each feature left by the lithographic step.

Figure 4E:
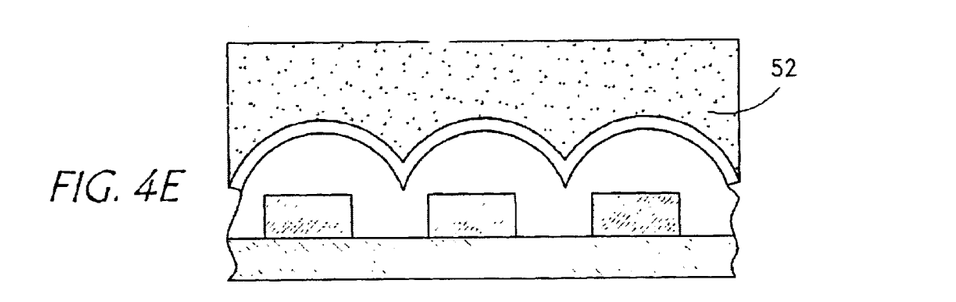
Figure 4F:
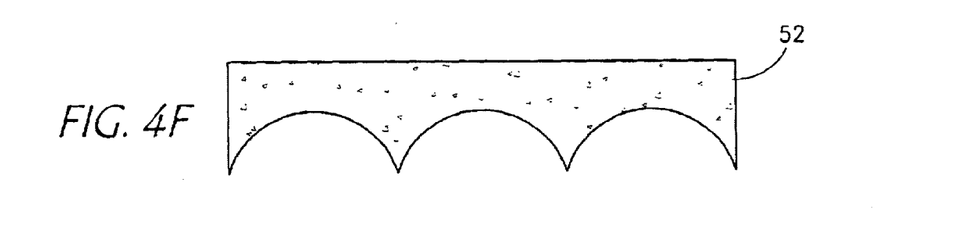

After the growth of the dielectric, an intermediate layer, similar to that described above, may be deposited over the lens-material or dielectric. Following the intermediate layer, as shown in FIG. 4E, a layer of metallic material 52 is deposited over the substrate. The metallic layer 52 will form a reverse replica of the surface profile formed on the substrate when removed from the substrate as illustrated in FIG. 4F.

Figure 5A:
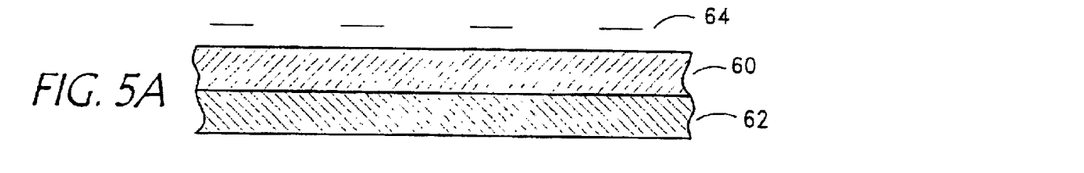
FIGS. 5A–5F show a process for fabricating an optical disk stamper or stamper ancestor from a second lithographically patterned substrate.
Figure 5B:
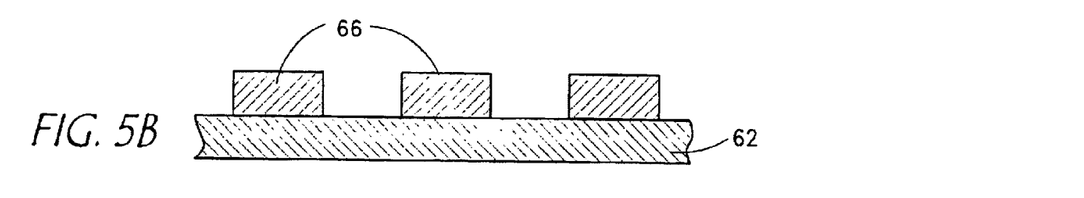

Another advantageous process for forming a surface topography to form micro-lens structures on a substrate is illustrated in FIGS. 5A to 5F. In this process, an initial lithographic step is performed as shown in FIGS. 5A and 5B, such as that in FIGS. 4A to 4C, on a substrate of silicon, or a suitable polymeric material. A photoresist 60 is coated onto the substrate 62, a mask 64 is placed on or above the photoresist, and the system is exposed to radiation. The photoresist is developed, and the remaining material will retain a desired pattern on the substrate.

Figure 5C:
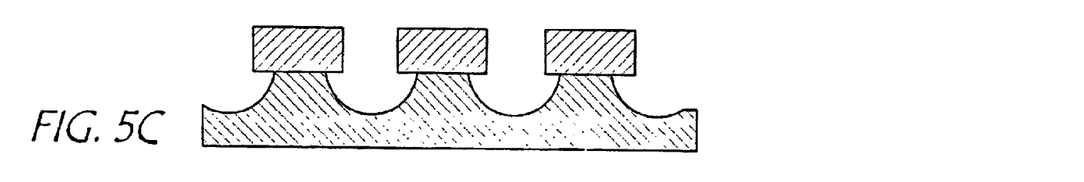
Figure 5D:
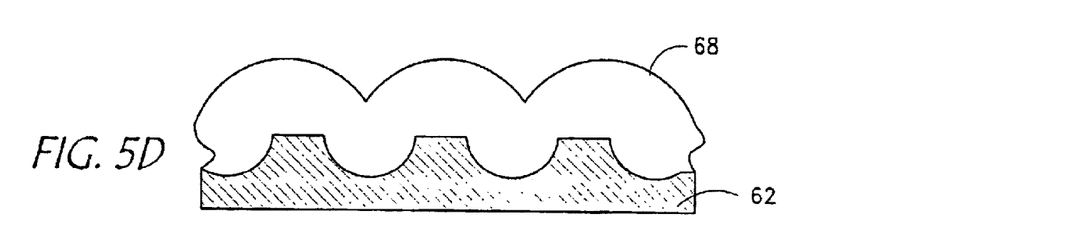
Figure 5E:
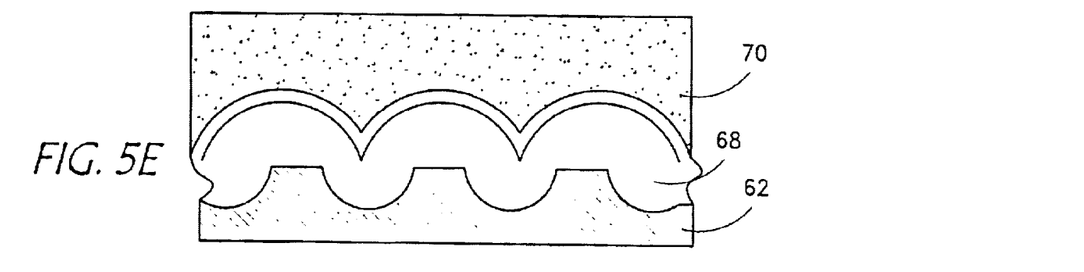
Figure 5F:
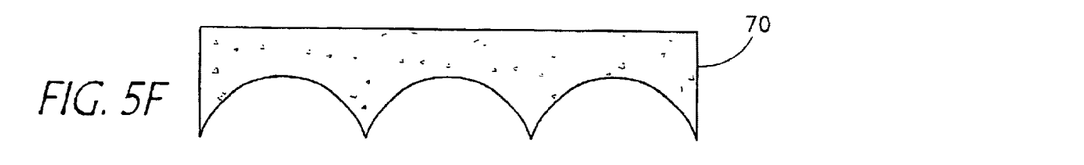

FIG. 5C illustrates the resultant substrate after an etching step has been performed. Material is removed from between the portions of photoresist 66 left by the lithographic technique. This etch step may include a liquid or gaseous phase etching technique, or another comparable step which are known to those of ordinary skill in the art. The substrate is then cleaned, and the remnant photoresist 66 is removed from the substrate. The features that have been left by the etching process will form the lens-base features for the growth process. FIG. 5D illustrates the substrate, subsequent to the deposition, and growth of a dielectric or other material over the substrate. As described above, the process of growth is very robust. The topology left by the etching process will yield growth patterns which form a preferably hemi-cylindrical shaped surface profile 68. After the growth of the dielectric, an intermediate layer, similar to that described above, may be deposited over the lens-material or dielectric.

Figure 3A:
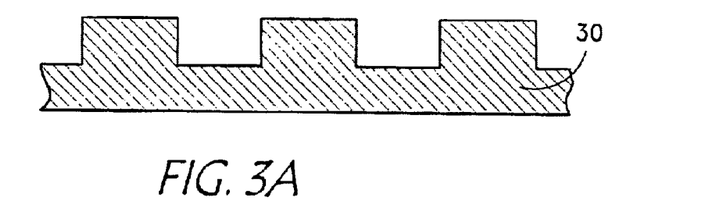
FIGS. 3A–3D show a process for fabricating an optical disk stamper or stamper ancestor from a rectangularly grooved substrate.
Figure 3B:
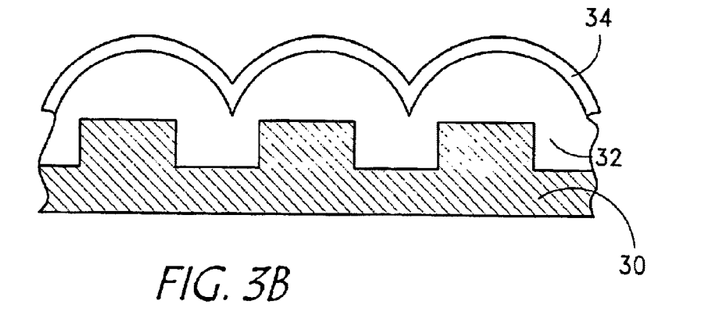
Figure 3C:
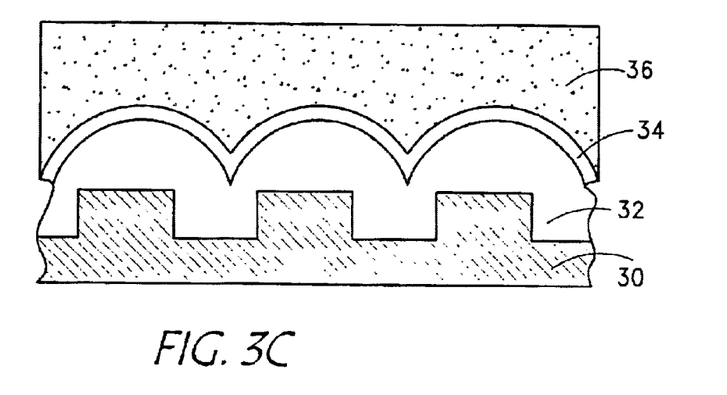
Figure 3D:
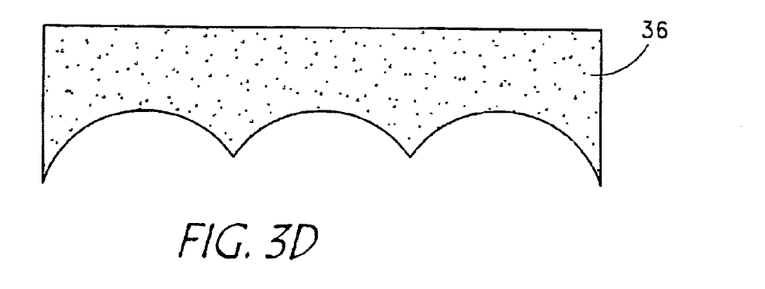

A metallic coating 70, similar to that of FIGS. 2C, 3C, and 4C is then applied over the layers. This metallic coating can then be removed from the layers and substrate to form a reverse replica of the surface profile, thus forming a stamper or stamper ancestor, as described above.

In this embodiment, the substrate would preferably be chosen to support multiple uses. For example, if the dielectric layer were damaged, removed, or grown improperly, the substrate can be cleaned and reused to fabricate the structures multiple times.

It will also be appreciated that modifications of these techniques can be used to create hemispherical structures of variable and/or alternating size. Uses of such structures and some methods of producing them are further disclosed in U.S. Pat. No. 6,115,348, and also in co-pending U.S. patent application Ser. No. 09/842,098, filed on even date herewith, and entitled Optical Storage Medium With Virtual Track Pitch. The disclosures of both of these documents are hereby incorporated by reference in their entireties.

Figure 6A:
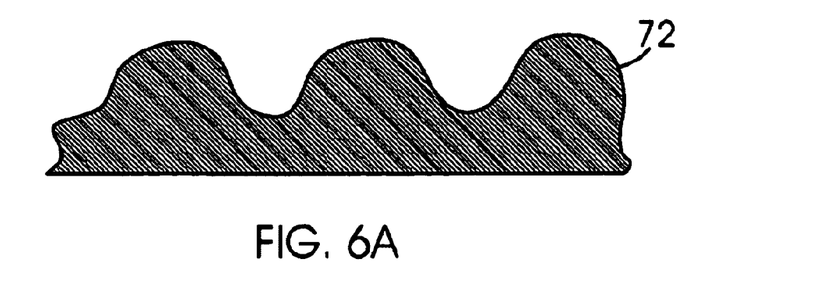
FIGS. 6A–6E show a process for fabricating an optical data storage medium from a sinusoidally grooved substrate.
Figure 6B:
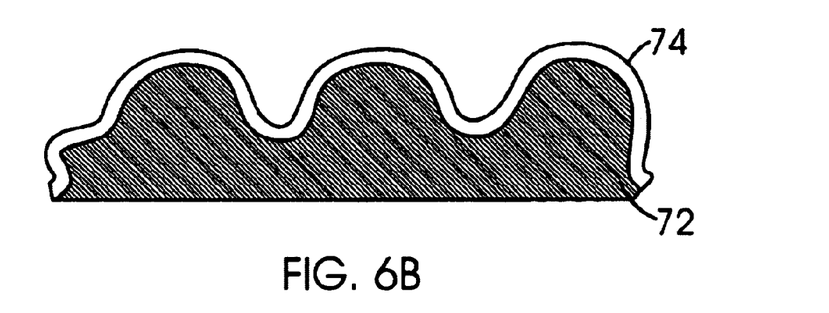
Figure 6C:
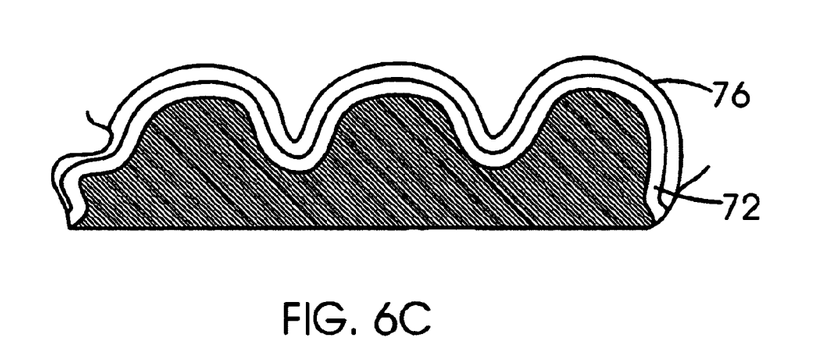
Figure 6D:
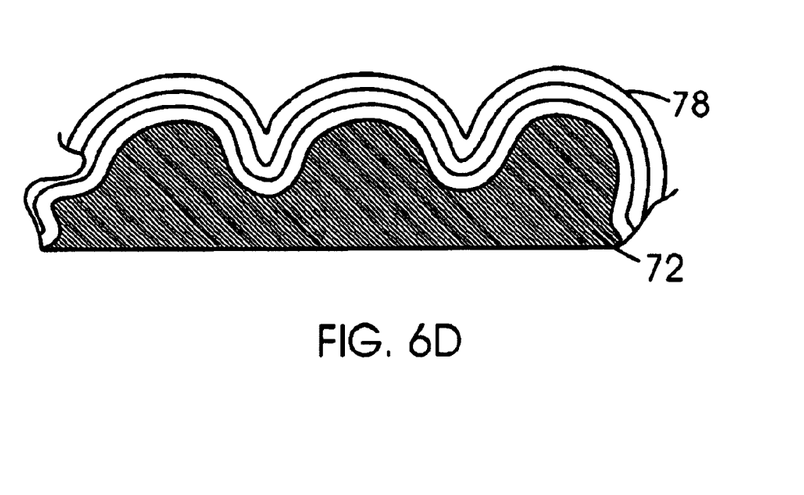
Figure 6E:
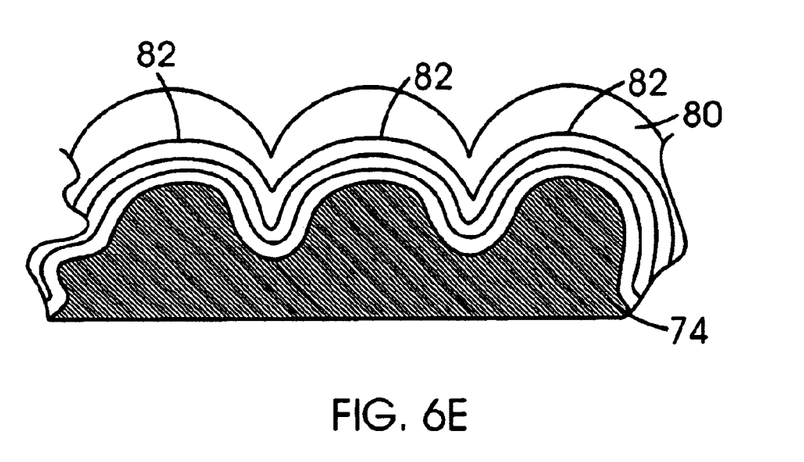

It is also possible to use deposition techniques to fabricate the optical disk itself, rather than a stamper or stamper ancestor for later molding. FIG. 6 illustrates one embodiment of this process. The initial substrate 72 shown in FIG. 6A, has a corrugated surface having grooves of an approximately sinusoidal nature, preferably with a high aspect ratio profile. These grooves may also be formed by any of the methods described above, and the substrate may be similar to that described above. The grooved substrate 72 is then coated with a series of layers of different materials. The first layer 74, illustrated in FIG. 6B, is preferably an aluminum layer. The aluminum may be sputter coated onto the substrate, and is preferably about 30–60 nm in thickness, with about 35 being found suitable in one embodiment. The aluminum layer 74 is followed by the deposition of a second layer 76 of a dielectric as shown in FIG. 6C. This second layer 76 may, for example, be co-deposited $ZnS$—$SiO_2$, and may preferably be 20–40 nm in thickness, with about 30 nm being found suitable in one embodiment. Subsequently, a GST or AST or other chalcogenide mix layer is formed above the second layer as shown in FIG. 6D. This third layer 78 advantageously comprises a layer of phase change, or otherwise writeable material which may have optical data written to it. This layer of writeable material 78 is preferably 10–30 nm thick, with 13–16 nm thick having been found suitable in one embodiment. Subsequently, a layer 80 of high index dielectric or semiconductor of about 80–100 nm thick is deposited above the previous layers, and will preferably exhibit the growth characteristics described above to form the hemi-cylindrical microlenses. The optical indices and physical thickness of each layer are calculated and tuned for best contrast between the amorphous and crystalline states of the phase change layer. FIG. 6E shows the high index dielectric layer, which may preferably comprise $TiO_2$, $ZnS:SiO_2$, or other similar materials, and may be about 90 nm thick, producing a total structural dimension of about 150–220 nm thick. This high index layer will exhibit the growth pattern as described above during deposition, and may be used to form a preferential surface profile of hemi-cylindrical features. Additionally, in some embodiments, an additional layer of low index dielectric may be formed between the phase change layer, and the high index layer. This layer may function in assisting in photon tunneling, and excitement of an evanescent field, or it may be a tuned metallic layer, which may function to excite surface plasmons.

As described above, an optical drive will typically view optically active portion of an optical disk through a cover layer of polycarbonate. When a phase change recording stack is fabricated in accordance with the embodiment of FIG. 6, it may therefore be desirable to bond such a polycarbonate layer, which may comprise a sheet of about 0.6 mm thickness, to the lens structure with UV curing optical epoxy having a similar index of refraction as the polycarbonate. This protects the lenses, and provides the correct optical path for the objective in a conventional optical disk drive.

In one embodiment of this invention, the media of FIG. 6E may be used without the above described polycarbonate cover layer for the storage of optically written data in flying head recording techniques, and has several advantages over media fabricated with conventional techniques in this application. Recently, attempts have been made to fly a laser diode very close to optical media for use in read/write applications. A typical laser, mounted in a conventional slider, has an aperture applied, or is etched, to form an aperture with a diameter smaller than the wavelength of emitted light. The spot which is thus formed by this laser onto an optical phase change, or other optical media, is smaller than the resolution limit of a far field objective, and the laser feedback can be used for reading and tracking the media, beneficially eliminating the need for an optical module. However, the gaussian focus of the beam leaving the aperture expands rapidly and, therefore, requires flying extremely close to the media, e.g., within about $1/10$ of the light wavelength. This close proximity introduces tribology problems near the fragile phase change layer, which may result in a crash, harming the device and possibly corrupting data stored within the media. With the media of FIG. 6, for example, the high index dielectric 80 is used to refocus the rapidly expanding gaussian profile of the laser, thus allowing the head to be positioned further away from the surface, e.g. about 0.5 to 2 wavelengths away. The high index dielectric layer 80 will therefore aid in the reduction of tribology problems, and other difficulties which arise from flying a read/write head close to an optical media. Furthermore, the lenses provide a rounded protective layer over the phase change layer, reducing damage in the event of a head crash in these types of systems.

Furthermore, with the optical media of FIG. 6, the data tracks 82 are located at the peaks of the sinusoidal profile. This increases thermal isolation between the tracks, improving read performance. From a mechanical perspective, the sinusoidal profile provides "fingers" for the subsequent coatings to adhere to, making the coating stack more robust, less prone to cracking, and less likely to be significantly damaged in the event of a head crash.

In embodiments of the invention where the above described growth processes are used for forming micro-optical elements directly, other advantageous materials may be employed for forming the lens elements having a high index of refraction, and a low absorbance. For example, GaP (3.46 n and 4×10-6 k), GaAs (3.866 n and 0.25 k), InP (3.44 n and 0.32 k), InAs (4.18 n and 0.42 k); where the values for n and k are quoted for a wavelength of 0.6 microns, are preferred materials, with GaP having especially advantageous characteristics. The sub-wavelength physical thickness of the micro-optical elements may also allow the use of materials with even higher absorbance, such as Germanium (4.5 n and 1.7 k) and InSb (4.24 n and 1.82 k). Additionally, combinations of the above referenced materials may also be used. Because some of the materials employed for the lens elements may be chemically reactive with the phase change layer 78, a thin stabilization layer of silicon dioxide or other dielectric may be applied first to separate the micro-optics from the phase change layer.

In addition to techniques which elicit the desired growth patterns above a substrate, techniques which take advantage of the smooth surface profile of fluids having surface tension, may be used to create a preferable surface profile, or micro-optical elements. The techniques illustrated in FIG. 7 generally comprise the preparation of a chemically heterogeneous surface pattern, coating or covering those areas defined in the patterning step with a liquid monomer, or prepolymer, and subsequent polymerization of the monomer/prepolymer. Additionally, subsequent to the formation of the preferred surface profile, a coating of metal may be applied to the surface profile as described above to obtain a stamper or stamper ancestor which is a reverse replica of the surface profile.

Figure 7:
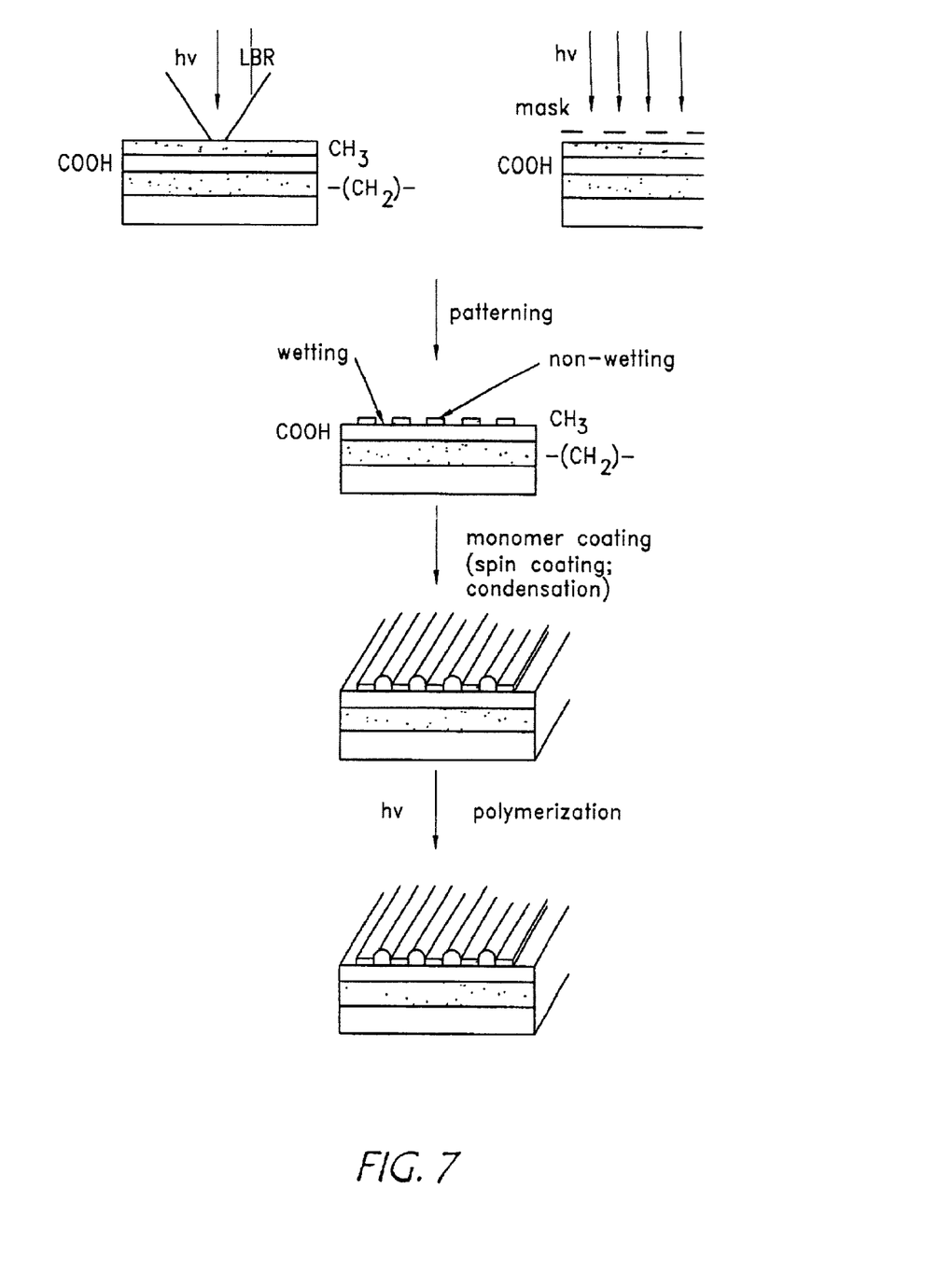
FIG. 7 shows a process for fabricating an optical disk stamper or stamper ancestor from a lithographically patterned substrate having deposited polymer.

To begin the process of FIG. 7, the surface of a substrate is first prepared with a stack of coatings which will be tailored towards the medium desired, and the processing techniques chosen to produce the desired surface chemistry for the stack. The chemical composition of the surface will define the liquid wetting properties, and the contact angle the liquid will form with the surface. The surface properties typically depend on the last few angstroms of material that are closest to the surface. This means that any changes to the surface energy can be effected by chemical modifications to the top surface layer.

In one embodiment, a photosensitive coating is applied to the surface of the stack as shown in FIG. 7A. This coating will preferably present a low energy terminal group to the surface of the stack, but upon exposure to radiation will present a higher surface energy terminal group in the exposed areas. Preferred materials include a self-assembled monolayer, or other photosensitive coatings. This exposure may be, for example, via laser writing, UV, or visible light. In another preferred embodiment, a photoresist that can be converted from hydrophilic to hydrophobic (or vice versa) can also be used for patterning as shown in FIG. 7B.

In preferred approaches to patterning, a self-assembled monolayer of long-chained organic molecules such as thiols on gold are used. These monolayers are ordered structures that can be reproducibly prepared. The surface properties are easily manipulated by choosing an appropriate terminal group for an amphilic molecule which is included in the monolayer. Since the range of surface energies available utilizing organic materials is limited to about 12–100 mJ/m$^2$, and at least one surface region should wet with a chosen prepolymer, the low surface energy component should have as low energy as possible. Examples of prepolymers that fit this group include $CF_3$, and $CH_3$. After the photochemical process, the chemical groups, such as COOH, and OH, which are exposed should have a strongest possible hydrogen bonding interaction with the prepolymer. The photosensitive groups are preferably buried by 2–3 methylene (or perfluoromethylene) groups from the surface to dampen any possible effects on the surface properties. Preferably, there is a sharp transition between regions of different surface compositions. FIG. 7C illustrates regions of wetting 86, and non-wetting 88 formed upon the surface subsequent to patterning.

In another embodiment, the surface may be patterned with two surface groups using micro-stamping techniques such as the application of a solution used to make a monolayer as an ink.

FIG. 7D illustrates the substrate with an applied prepolymer layer. The prepolymer/monomer layer may be applied by various methods such as coating the entire surface with a thin liquid layer via, for example, spin coating, or the monomer may be condensed from the gaseous phase onto the high energy regions. The liquid used may be organic solvent based, including pure monomer, or aqueous based utilizing water as a solvent or reagent. When the layer is applied to the surface, the wetting areas will allow the liquid to form a bead, and the surface tension will draw the liquid into a preferential surface profile. The non-wetting areas will repel the liquid. As shown in FIG. 7E, the monomer/prepolymer having the desired surface profile is exposed to radiation in order for polymerization to occur.

The polymerized surface profile will preferably form micro-lenses for a media substrate upon which they are formed. However, the preferential surface profile formed using this, as well as other methods disclosed herein, may be subsequently coated with metallic layer to form a reverse replica of the surface profile. This reverse replica may be used as a stamper to create subsequent copies of the surface profile for use with other media. Preferably, a release layer, as described above, will be employed to facilitate the removal of the reverse replica from the surface profile.

Electrolytic deposition techniques can also be used to form approximately hemispherical or hemicylindrical structures. In this process, a thin track of conductive material may be patterned lithographically onto a non-conductive substrate. This track can be used as one electrode in a conventional electrolytic deposition process. Due to the non-directional nature of the electrolytic deposition, a hemicylidrical shaped structure will form over and along the extent of the thin conductive track. If one or more small conductive spots are used, rather than thin tracks, hemispherical shapes will form over the spots.

For the production of optical data storage media, thin tracks may be first formed as a single spiral or two interleaved spirals. If two unconnected interleaved spirals are used, the hemicylindrical structures can be created independently on each spiral by using only one or the other as the electrode in a serial two step deposition process. In this embodiment, one spiral hemicylinder may be formed using a first deposition rate or time, and the other spiral hemicylinder may be formed using a second deposition rate or time. This will produce hemicyliders of different size for the two interleaved spiral tracks. This may be useful in some optical data storage media, as described in the Optical Storage Medium With Virtual Track Pitch patent application mentioned above.

The techniques described above can be applied to a wide variety of applications where micro-optical elements are desired, including all forms of optical data storage media such as write once, read only, or re-writeable types. In addition, it will be appreciated that hemi-spherical lenses can also be formed using these methods. For example, if the substrate initially has a sinusoidal profile in two orthogonal dimension, the deposition processes described above will form hemispherical lenses at the peaks of the substrate, producing a two dimensional array of hemi-spherical structures.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method of making a stamper or stamper ancestor for fabricating an optical disk comprising:

forming a single layer substrate having a corrugated upper surface profile;

depositing a layer of material onto said upper surface so as to form a combined substrate and layer structure having an upper surface profile comprising an adjacent series of structures having a substantially hemicylindrical contour.

2. The method of claim 1, wherein said forming comprises grooving a substrate with a spiral groove.

3. The method of claim 1, wherein said forming comprises depositing, exposing, and developing a photoresist.

4. The method of claim 1, wherein said forming comprises etching through an exposed and developed photoresist layer.

5. The method of claim 1, wherein said forming comprises forming a substrate having an approximately sinusoidal upper surface profile.

6. The method of claim 1, wherein said forming comprises forming a substrate having an approximately rectangular upper surface profile.

7. The method of claim 1, additionally comprising: depositing metal onto said combined substrate and layer structure; removing said metal to form an inverted replica.

8. A method of making an optical data storage media, said method comprising:

forming a single layer substrate having a corrugated upper surface;

depositing at least one layer of optically active material over said substrate;

depositing a layer of material onto said optically active material so as to form lenses over said optically active material having a substantially hemi-cylindrical contour.

9. The method of claim 8, wherein said depositing at least one layer of optically active material comprises depositing a phase change stack.

10. The method of claim 8, additionally comprising bonding a substantially transparent cover sheet onto said lenses.

11. The method of claim 10, wherein said cover sheet comprises polycarbonate.

12. A method of making an optical data storage medium comprising:
- forming one or more convex substantially hemicylindrical structures with a deposition process characterized by substantially uniform growth on a single layer substrate;
- serially replicating said structures to form a stamper having one or more convex substantially hemicylindrical structures;
- molding a plastic blank using said stamper as part of a mold assembly to form a plastic substrate having one or more concave grooves with a substantially hemicylindrical contour; and
- filling said grooves with a dielectric material so as to form convex lenses when viewed from the surface of the plastic blank opposite from the grooved side.

13. The method of claim 12, wherein said plastic blank comprises polycarbonate.

14. The method of claim 1, wherein depositing said layer of material comprises vacuum deposition.

15. The method of claim 1, wherein depositing said layer of material comprises sputter coating said material onto said upper surface under vacuum conditions.

16. The method of claim 1, wherein depositing said layer of material comprises a process characterized by substantially uniform growth.

17. The method of claim 1, further comprising:
- depositing a separation layer by accumulating inorganic material onto said upper surface.

18. The method of claim 17, wherein said inorganic material is accumulating by a process selected from the group consisting of sputtering, electroplating, and other deposition technology.

19. The method of claim 1, wherein said corrugated upper surface profile comprises a profile selected from the group consisting of (i) alternating convex and concave structures, (ii) grooves having an approximately sinusoidal cross section, (iii) grooves having a rectangular cross section, (iv) grooves having a trapezoidal cross section and (v) grooves having a flat sided geometric shape.

20. The method of claim 1, wherein forming said substrate having a corrugated upper surface profile comprises the steps of:
- forming a pattern of photo-sensitive synthetic resin on said substrate using one or more lithographic techniques;
- etching said substrate to remove substrate material from between elements of said pattern of photo-sensitive synthetic resin; and
- removing said pattern of photo-sensitive synthetic resin.

21. The method of claim 8, wherein said layer of material deposited onto said optically active material comprises a material selected from the group consisting of gallium phosphide (GaP), gallium arsenide (GaAs), indium phosphide (InP), indium arsenide (InAs), germanium and indium antimonide (InSb).

* * * * *